July 31, 1923.
G. HAMEL
1,463,694
AEROPLANE
Filed April 4, 1922
7 Sheets-Sheet 1
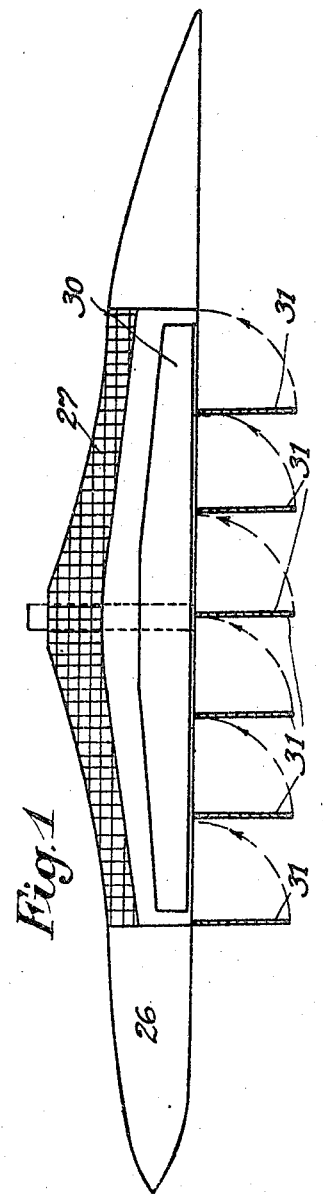
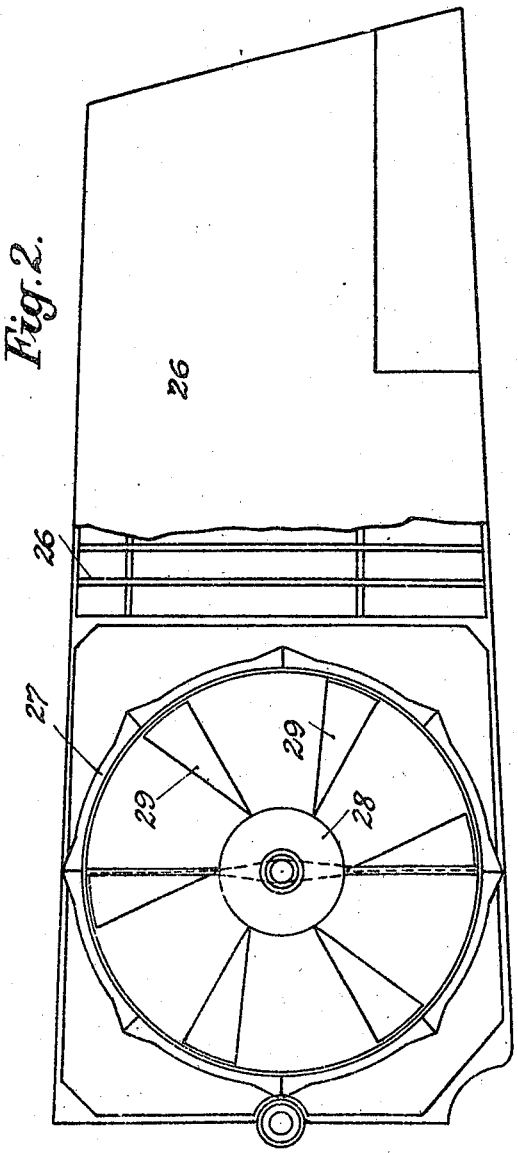
INVENTOR:
GEORGES HAMEL.
ATTORNEY.

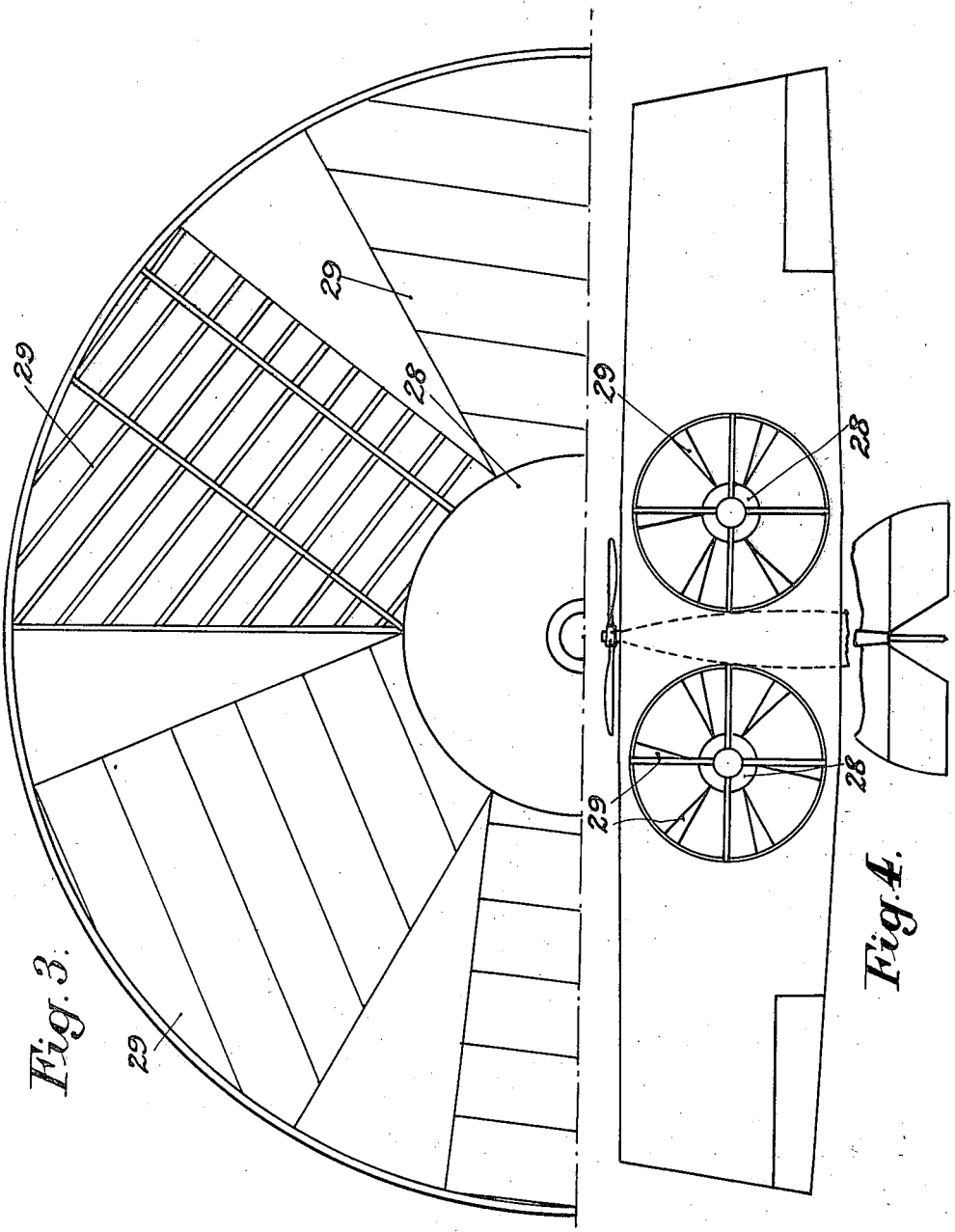

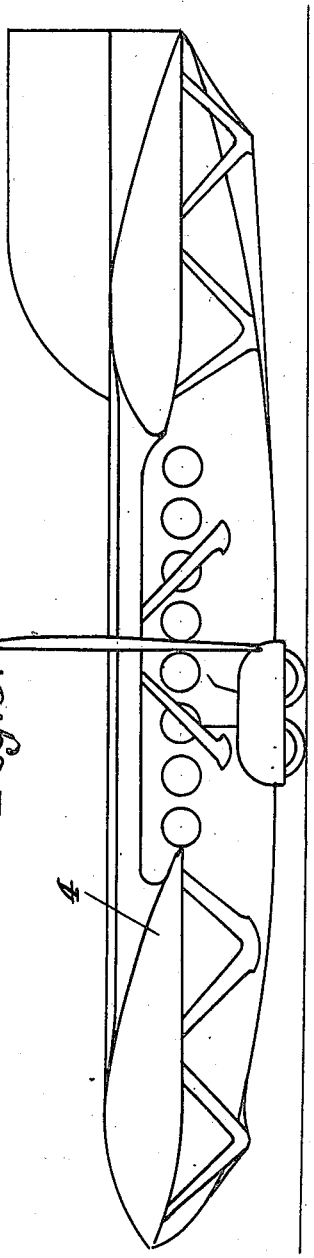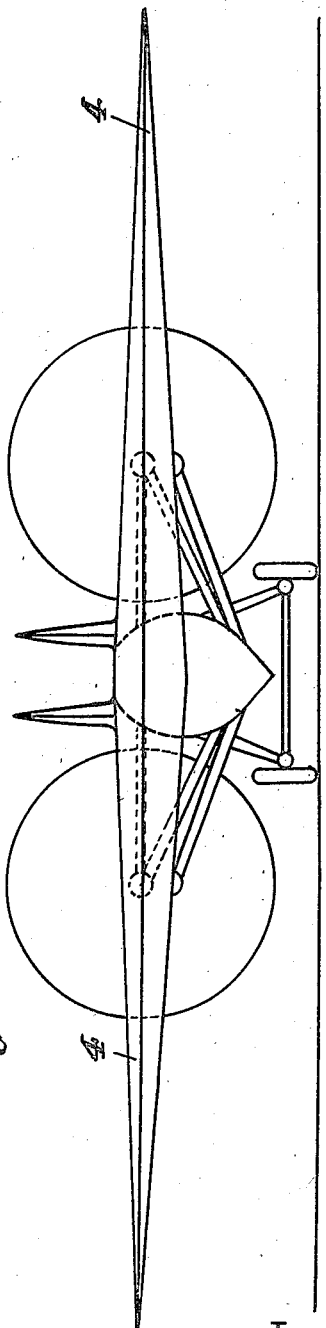

July 31, 1923.

G. HAMEL

AEROPLANE

Filed April 4, 1922

INVENTOR:
GEORGES HAMEL
ATTORNEY.

INVENTOR
GEORGES HAMEL.
ATTORNEY.

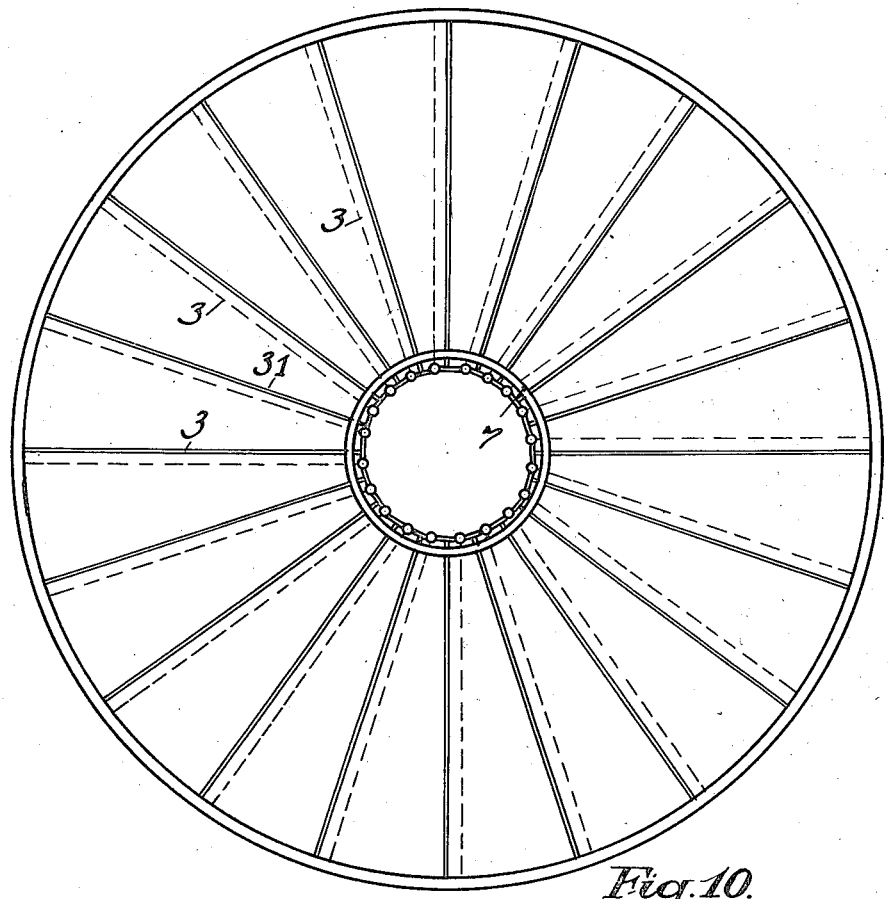
Fig.10.
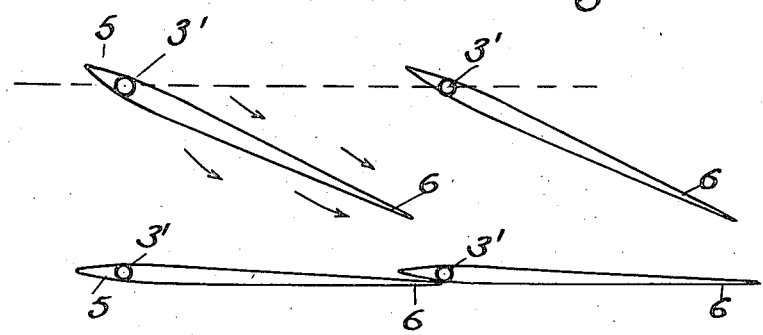
INVENTOR:
GEORGES HAMEL.
ATTORNEY.

Patented July 31, 1923.

1,463,694

UNITED STATES PATENT OFFICE.

GEORGES HAMEL, OF LES AYDES, FRANCE.

AEROPLANE.

Application filed April 4, 1922. Serial No. 549,576.

*To all whom it may concern:*

Be it known that I, GEORGES HAMEL, a citizen of the French Republic, and resident of Les Aydes, France, have invented certain new and useful Improvements in Aeroplanes, of which the following is a specification.

Aeroplanes are actually the only flying machines heavier than air which may perform safe and rapid flights. Notwithstanding its good qualities as a flying device, it is desirable that it should keep a minimum speed near the ground and more in an inclined direction, which offers danger in certain conditions; for instance it prevents the sight of the pilot and difficulties occur when the space for starting is reduced.

On the other hand the recently invented helicopter allows of a substantially vertical flight being performed and by itself may do away with the danger inherent to the aeroplane. However a helicopter is not adapted for a horizontal translation and its lack of plane surface constitutes a danger when driving downwards, if the motor should stop.

The object of the present invention consists in combining, the principle of the aeroplane with that of the helicopter, so as to enable the apparatus to fly in a horizontal direction and to rise vertically and to hover without horizontal movement. This object is attained by rotatingly mounting one part of a flying machine without interfering with the operation of the apparatus when used as an aeroplane for flying horizontally at high speed.

Principally:

1. The apparatus should be sustained by means of parts not requiring a translation in a horizontal direction during the operating.

2. The parts should be disposed in such a manner that when they are started or stopped, the center of gravity of the apparatus remains unchanged, in order that the apparatus is kept in balance whatever be the conditions of flight.

3. The parts should be disposed in such a manner that they do not constitute an impediment against the flight of the apparatus.

4. The apparatus should be provided, besides the usual stabilizing devices, with a particular device enabling the stabilization of same without the necessity of said particular device being moved horizontally for starting.

In the accompanying drawings, two constructive forms of the combination helicopter and usual flying machine are shown; in which drawings:

Fig. 1 is a diagrammatic view of a plane with its elevating and sustaining device and its pressure openings.

Fig. 2 is a plan view of the said plane.

Fig. 3 is a diagrammatic detail view of the ascending propeller showing the structure of the rotary wings.

Fig. 4 is a diagrammatic plan view of the aeroplane.

Fig. 5 is a diagrammatic lateral section of a constructive form applied to a biplane disposed in tandem.

Fig. 6 is an end view.

Fig. 10 is a detail of the shutters.

Figure 7:
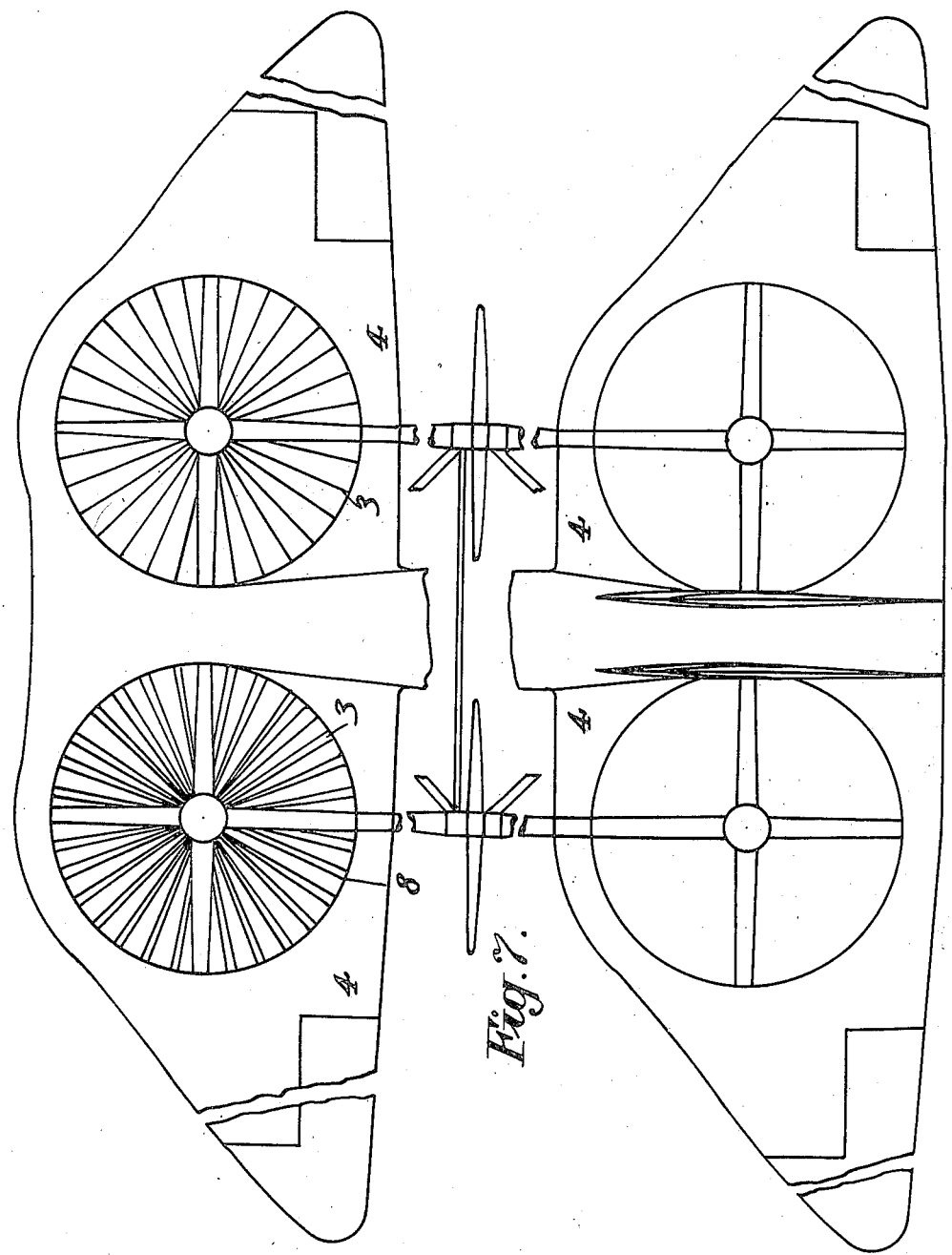
Fig. 7 is a plan view shown from above, of the wings, sustaining means and upper shutters.

The hereinafter described and illustrated devices may be applied to any type of flying machine; the drawings are only given by way of example and it is understood that I do not limit my invention to such particular arrangements. From the various figures the position of all sustaining propulsive and stabilizing devices of a usual flying machine for simple flying purposes may be easily used, said devices being well known and not specifically included in my invention and no mention is made of them in the present specification. In the same way the constructive details have been omitted, as such details may vary, without departing from the principle of the invention. I only explain in a concrete manner the principle of the invention by diagrammatic figures the construction (proportion, drives and the like) varying according to the kind of apparatus and to the manufacturer.

In the apparatus shown in Figs. 1 to 4, there is made use of two sustaining devices as follows: Near the shoulder a large circular frame 27 is inserted into the wing 26. Within this frame is rotatively mounted a sustaining element 30, formed of a hub 28 provided with ball bearings, abutments and gear drive and a plurality of rotary wings 29 disposed in such a manner that they act upon the air by means of a large surface directed at a relatively small angle in order to get a high output.

The shape of the fixed planes containing said ascending devices may be modified (for instance displaced) in order that the centre of sustentation coincides with the centre of pressure of the ascending means and with the centre of gravity of the whole (see Figs. 5 to 10).

The motor arrangement of the flying machine is connected to the sustaining means by a mitre gear or the like transmission. Said transmission is provided with a coupling device and a differential gear (not shown) intended for balancing the stresses. However this differential gear may be blocked at will by the pilot.

Shutters 31 are disposed below the sustaining means so as to enable air to be pressed through the apertures. Said shutters are turned down in their closed position whilst the machine is flying like a usual aeroplane. The pilot operates same from his seat.

The sustaining means 30 being wholly within the plane, do not interfere with the horizontal translation. The pilot operating at one hand the usual driving devices, and on the other hand the operating means of the couplings of the sustaining devices, may, by this combined means and by varying the working of the motor, obtain at will the various flying features. He may impart any required horizontal speed just as in a usual flying machine. He may rise or go downwards in a vertical direction being always enabled to perform a descent as usual in case the motor would fail, which latter could not be done with a helicopter proper.

The apparatus according to Figs. 5 to 10 is based on the same principle of combination of a helicopter with a usual flying machine; involving however some improvements compared with the above described apparatus and differentiates itself from the latter by the following features:

1. The sustaining elements with rotary wings are replaced by usual propeller screws.

2. The shutters for pressing air instead of being in parallel relation with each other and at an angle of 90 degrees with respect to the flying direction, are radially disposed and may assume any desired inclination in view of a satisfactory output of the system.

3. Above the ascending devices are disposed sucking shutters which, when closed, provide a continuous surface of the plane.

4. The number of ascending devices is increased and they are disposed round the centre of gravity in such a manner that, when operating, devices by which the rotary speed of the ascending devices may be varied, either separately or simultaneously, a stabilizing effect may be obtained on the whole of the apparatus.

Figs. 5 to 10 show a tandem biplane.

Figure 8:
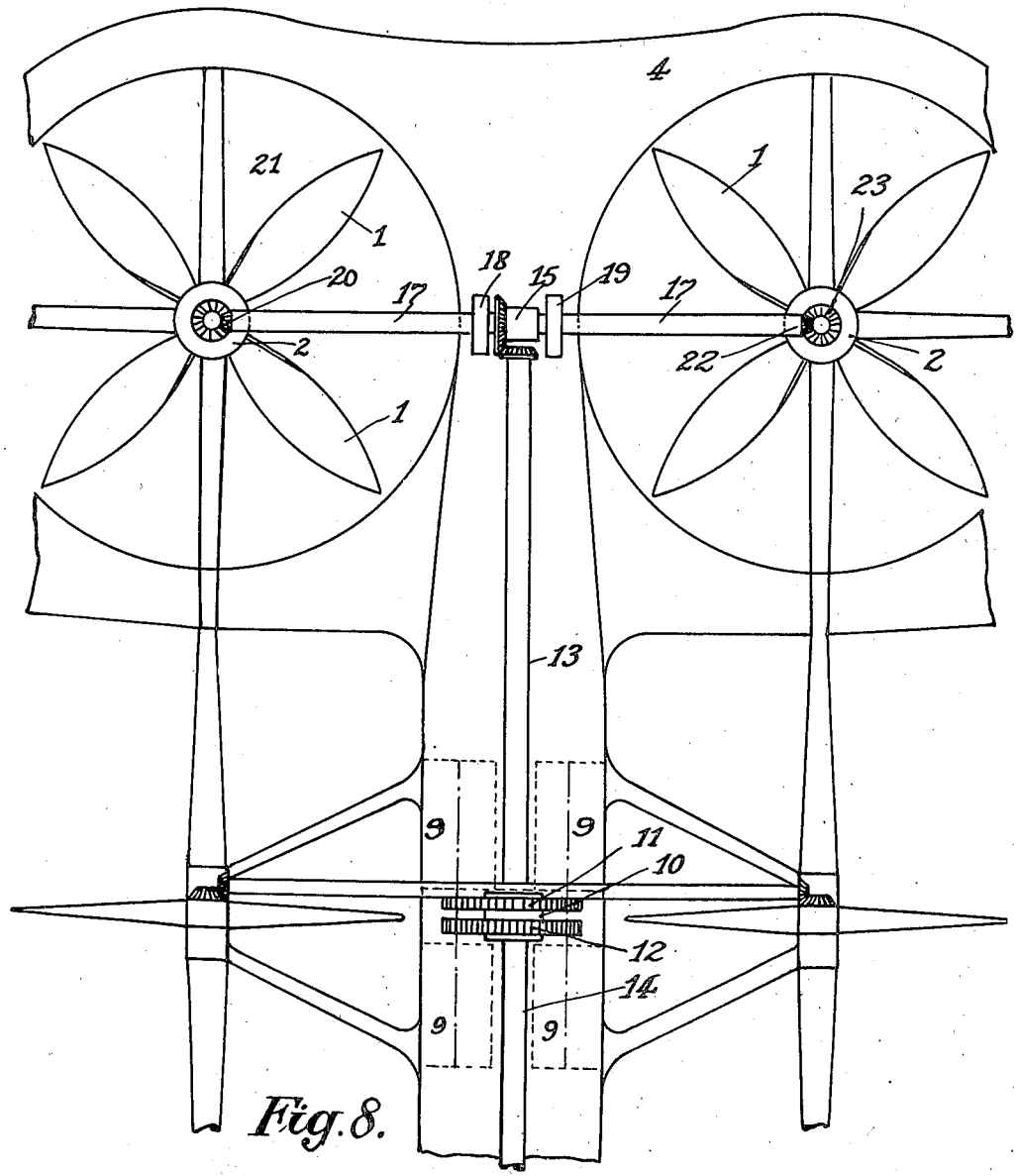
Fig. 8 shows in horizontal projection, the driving devices of the sustaining means of an apparatus having four motors and four sustaining means.

Referring more particularly to Figs. 7 to 10, the sustaining devices are formed by usual propellers 1 supported by a hub 2 and located within a large frame disposed near the shoulder of the plane (Fig. 8).

Said propellers are driven by the motor or motors of the flying machine in the manner which will be explained further on. The position of said sustaining devices and the shape of the fixed plane are combined in such a manner that the resultant of the pressures of the sustaining devices is applied more or less on a point coinciding with that of the pressures formed by the planes when the machine is flying as a usual flying machine; it results thereof that the centering of the apparatus remains correct whatever may be the nature of the flight.

The pressure shutters are radially disposed underneath the sustaining devices. Above the latter are disposed the sucking shutters which are like the first named ones.

The sucking as well as the pressure shutters are disposed so as when open, the masses of air put in motion by the sustaining devices, may flow through the apertures and when closed, they provide a continuous surface of the planes, in order that the sustaining devices do not form a hindrance while the machine is flying as a usual flying machine. In the left upper part of Fig. 7 the sucking shutters 3 are shown in an open position and on the right side, said shutters, are closed, providing an uninterrupted surface of plane 4. Said shutters are radially disposed in shape of the obturating blades of circular radiators and operated, like the latter, by means of convenient cables or the like. The covering of the shutters is made in such a manner that the ventral pressures or dorsal depressions (see arrow Fig. 10) during the usual flight of the machine, have a tendency to keep the shutters closed. This closing is produced by overlapping, the shutters being rotatively mounted on hinges 3', the overlapping occurring in that the head 5 covers the tail 6. Fig. 10 is a diagram showing the connection and arrangement of the shutters of pressure as well as of the sucking ones.

Figure 9:
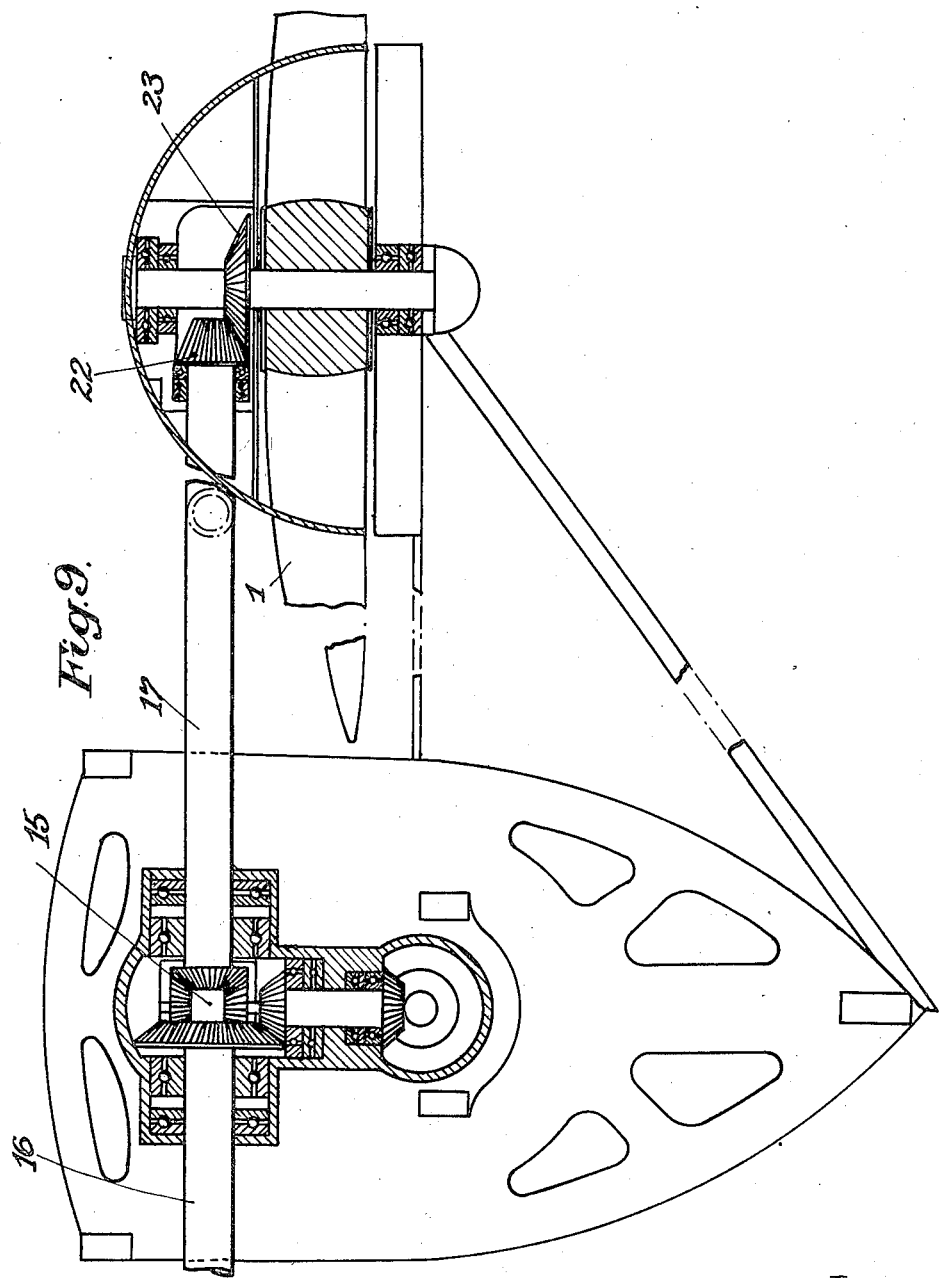
Fig. 9 is a front view of said driving device.

In order to obtain the stabilizing effect without a horizontal displacement, it is convenient to make use of a peculiar transmission whereby the rotary speed of the sustaining devices may be varied; the displacement of the resultant of the pressures thus obtained forming with gravity, a couple which enables the pilot to incline at will the apparatus and to stabilize the machine. Such a transmission is shown by way of example in Figs. 8 and 9. This transmission is intended for an apparatus with four motors and four sustaining devices. In Fig. 9 the front gear only is shown as the whole is symmetrically disposed on both sides of the motors. Said motors operate a central casing 10 containing two couplings 11 and 12. Said couplings are operated by the pilot, either simultaneously or separately, by any convenient means. Said couplings operate shafts 13 and 14, which in turn operate the two sets of sustaining devices on front and at the rear (Fig. 8). Shaft 13 operates the front set by the intermediary of a differential 15 and the two shaft portions 16 and 17 on which are mounted the brakes 18 and 19. The shafts 16 and 17 operate by means of pinions 20, 21 and 22, 23 the sustaining devices. The motors being in operation, the pilot couples progressively 11 and 12, and the rising system is actuated. Suppose the apparatus inclines; the shaft 14 is slightly uncoupled by operating the coupling 12, whereby the rear sustaining pressure is lowered and the resultant of the pressures in the direction of the front is displaced, and a readjustment of the apparatus to its normal position occurs.

When the apparatus inclines towards the rear, 13 should be uncoupled. In case of lateral inclining, the pilot acts upon the brakes of the sustaining devices of the higher side and the differential gears cause a slackening of these sustaining devices whereas the planes on the lower side rotate with higher speed. The resultant is consequently shifted towards the lower side of the apparatus and produces a readjustment of same.

Figs. 5 and 6 are simply diagrammatical views of the whole device showing, without any constructive details the general view of the flying machine.

Having now fully described my said invention, what I claim and desire to secure by Letters Patent, is:

1. An aeroplane having fixed planes, a plurality of elevating devices operative in the body of such planes, with the line of thrust thereof arranged in a plane passing vertically through the center of gravity of the aeroplane, pressure shutters below said devices, suction shutters above said devices, each respective set of shutters forming a continuation of the adjacent surface of the plane when such shutters are closed, and means for controlling the degree of opening of said shutters at will.

2. In an aeroplane, the combination with the fixed planes of a plurality of sustaining elevatory elements formed by propeller screws fitted within hollows provided in the body of the planes of radially disposed pressure shutters underneath said elements, sucking shutters above the elements, and a drive for the sustaining elements to relatively vary the rotary speed thereof to stabilize the apparatus, said drive including brakes for the devices.

Dated this 21st day of March, 1922.

GEORGES HAMEL.